United States Patent
Liu et al.

(10) Patent No.: US 9,513,655 B1
(45) Date of Patent: Dec. 6, 2016

(54) INTERFACE CIRCUIT WITH VARIABLE OUTPUT SWING AND OPEN TERMINATION MODE FOR TRANSMITTING SIGNALS

(71) Applicant: OMNIVISION TECHNOLOGIES, INC., Santa Clara, CA (US)

(72) Inventors: Min Liu, Fremont, CA (US); Po-Chia Lai, Fremont, CA (US); Charles Qingle Wu, Palo Alto, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 0 days.

(21) Appl. No.: 14/951,317

(22) Filed: Nov. 24, 2015

(51) Int. Cl.
  *G05F 5/00* (2006.01)
  *H03K 17/687* (2006.01)

(52) U.S. Cl.
  CPC ............... *G05F 5/00* (2013.01); *H03K 17/687* (2013.01)

(58) Field of Classification Search
  CPC .......................................................... G05F 5/00
  See application file for complete search history.

(56) References Cited

U.S. PATENT DOCUMENTS 7,619,448 B2 * 11/2009 Wu ..................... H03F 1/0205
                                                    326/121
8,928,365 B2 *  1/2015 Li .................... H03K 19/01755
                                                    327/112

2012/0307122 A1   12/2012 Liu et al.

OTHER PUBLICATIONS

Wong, K. J. et al., "A 27-mW 3.6-Gb/s I/O Transceiver", IEEE Journal of Solid-State Circuits, vol. 39, No. 4, Apr. 2004, pp. 602-612.
Palmer, R. et al., "A 14mW 6.25Gb/s Transceiver in 90nm CMOS for Serial Chip-to-Chip Communications", 2007 IEEE International Solid-State Circuits Conference, Session 24, Multi-Gb/s Transceivers, 24.3, 2007 IEEE, pp. 440-441 and 614.

* cited by examiner

*Primary Examiner* — Hai L Nguyen
(74) *Attorney, Agent, or Firm* — Blakely Sokoloff Taylor & Zafman LLP

(57) ABSTRACT

An interface circuit includes a pre-driver coupled convert a single-ended signal to an intermediate differential signal. An output driver is coupled to convert the intermediate differential signal to an output differential signal having a variable output swing responsive to a mode select signal and a second supply voltage. A replica bias circuit is coupled to receive a first supply voltage, the mode select signal, and an open termination enable signal to generate a bias signal. An internal regulator is coupled to receive the bias signal and the first supply voltage to supply the second voltage to the output driver in response to the bias signal. An open termination circuit is coupled to an output of the output driver, and is coupled to receive the open termination enable signal to couple an internal load to the output of the output driver in response to the open termination enable signal.

22 Claims, 3 Drawing Sheets

INTERFACE CIRCUIT WITH VARIABLE OUTPUT SWING AND OPEN TERMINATION MODE FOR TRANSMITTING SIGNALS

BACKGROUND INFORMATION

Field of the Disclosure

The present invention relates generally to circuits. More specifically, examples of the present invention are related to interface circuits that transmit signals.

Background

Electronic circuits consume power to operate. When communicating between electronic circuit elements, electronic signals are typically transmitted and received across electrical conductors coupled between the circuit elements. The communications are typically realized with electrical voltages and/or currents that are transmitted and received across the electrical conductors between the input and output circuitry of the electronic circuits.

There are many design choices that designers must consider when designing electronic circuits that need to interface with other circuits. For instance, it is often necessary for a circuit designer to design interface circuitry with matched impedances between the transmitter and receiver circuits in order to reduce losses and reflections that occur in transmission lines between the various circuit elements that are communicating with one another. In addition, circuit designs also typically employ fixed predetermined voltage swings in the communication signals as set forth in specifications in order for the transmitter and receiver circuits to reliably communicate with one another across the communication lines between the circuits.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Figure 1:
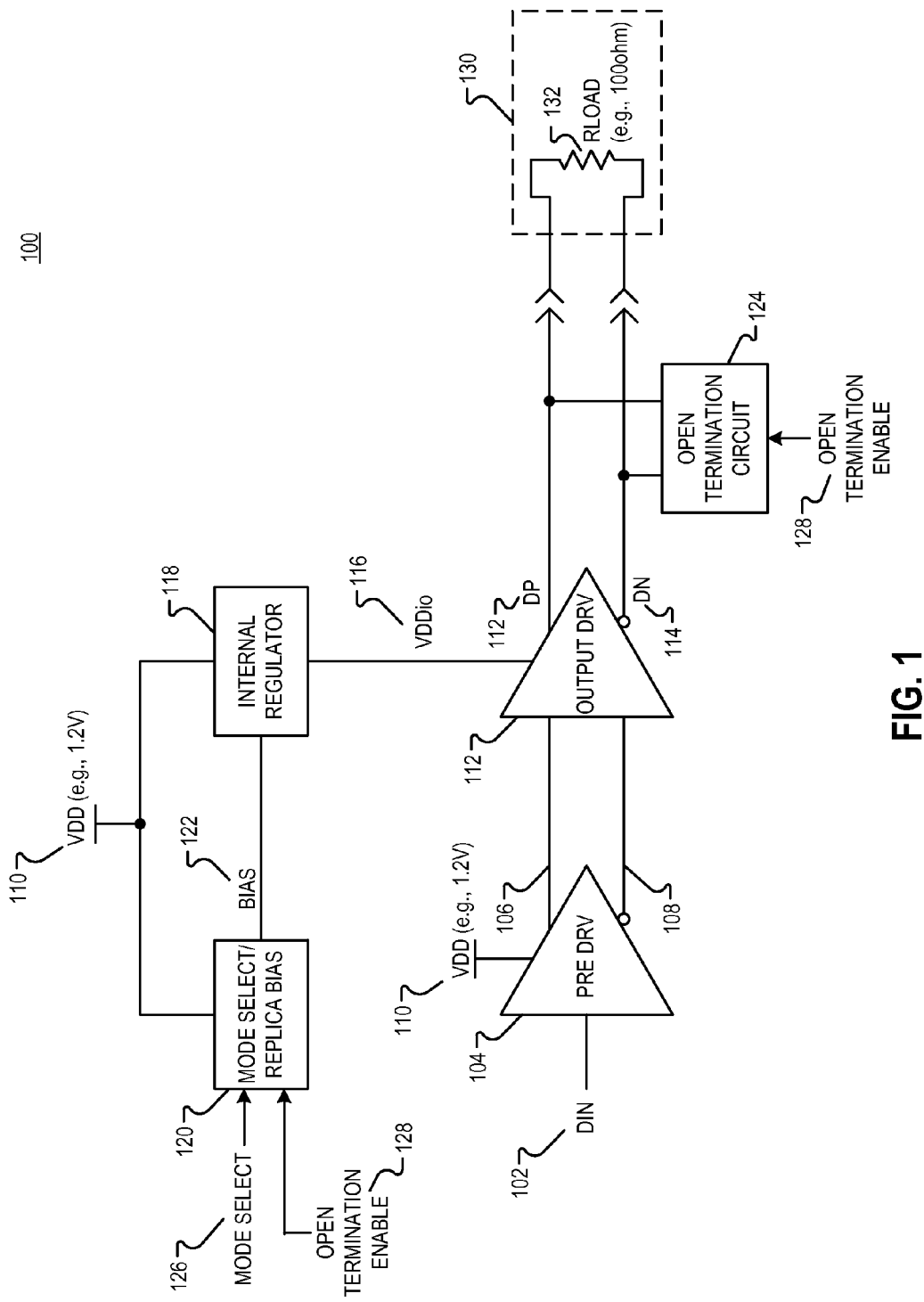
FIG. 1 is a block diagram illustrating one example of an interface circuit for transmitting a signal in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

As will be shown, methods and apparatuses directed to interface circuits that transmit signals with variable output swings and open termination modes are disclosed. In the following description, numerous specific details are set forth in order to provide a thorough understanding of the present invention. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," an embodiment, "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. The following is a detailed description of the terms and elements used in the description of examples of the present invention by referring to the accompanying drawings.

As will be discussed, examples of interface circuits that can transmit signals with customizable variable output swings and open termination modes with mismatched impedances are described in detail below, which provide circuit designers additional flexibility to optionally configure interface circuits for increased transmission output capabilities and open termination modes, which may fall outside of a specification range, in applications that can support it, such as for example situations in which the distances between transmit and receive circuits are short enough to tolerate different voltage swings and/or impedance mismatches in accordance with the teachings of the present invention.

To illustrate, FIG. 1 is a block diagram illustrating one example of an interface circuit 100 for transmitting a signal in accordance with the teachings of the present invention. As shown in the depicted example, interface circuit 100 includes a pre-driver 104 coupled to receive a data input signal DIN 102. In one example, data input signal DIN 102 is a single-ended signal, which may be represented with a voltage signal on a single conductor as shown. In the example, pre-driver 104 is coupled to convert the single-ended signal data input signal DIN 102 to an intermediate differential signal at the differential pair of outputs 106 and 108 of pre-driver as shown. In one example, pre-driver 104 is coupled to be powered from a first supply voltage VDD 110, to produce a first voltage swing across the differential pair of outputs 106 and 108 when generating the intermediate differential signal output of pre-driver 104. In one example, the first supply voltage VDD 110 is equal to a "normal" supply voltage, such as for example 1.2 volts, and the first voltage swing across the differential pair of outputs 106 and 108 ranges from 0 volts to 1.2 volts. In other examples, it is appreciated that the first supply voltage VDD 110 and the first voltage swing may have other values and still enjoy the benefits of the present invention. In the example, the differential pair of outputs 106 and 108 are complementary outputs, as represented with the small circle on output 108 and no circle on output 106. Therefore, when the signal on output 106 is high, the signal on output 108 is low, and vice versa.

An output driver 112 coupled to receive the intermediate differential signal from the differential pair of outputs 106 and 108 of the pre-driver 104. In the example, the output driver 112 is coupled to convert the intermediate differential signal from the differential pair of outputs 106 and 108 to an output differential signal at the differential pair of outputs DP 112 and DN 114 of output driver 112. In one example, output driver 112 is coupled to be powered from a second supply voltage VDDio 116, to produce a second voltage swing across the differential pair of outputs DP 112 and DN 114 when generating the output differential signal output of output driver 104. In one example, the second supply voltage VDDio 116 is equal to a "lower" supply voltage, such as for example 0.4 volts, and the second voltage swing across the differential pair of outputs DP 112 and DN 114 ranges from 0.1 volts to 0.3 volts. Thus, the second supply voltage VDDio 116 is less than the first supply voltage VDD 110, and the second voltage swing is less than the first voltage swing. In other examples, it is appreciated that the second supply voltage VDDio 116 and the second voltage swing may have other values and still enjoy the benefits of the present invention. For instance, in other examples, it is appreciated that the second voltage swing across the differential pair of outputs DP 112 and DN 114 may range from approximately 0.25*VDDio to 0.75*VDDio for a receiver termination mode. In another example, the voltage swing may range from 0*VDDio to VDDio for an open receiver termination mode. In the example, the differential pair of outputs DP 112 and DN 114 are complementary outputs, as represented with the small circle on output DN 114 and no circle on output DP 112. Therefore, when the signal on output DP 112 is high, the signal on output DN 114 is low, and vice versa.

In the illustrated example, a replica bias circuit 120 is coupled to receive the first supply voltage VDD 110 and an open termination enable signal 128 to generate a bias signal 122 that is responsive to the open termination enable signal 128. In addition, the example depicted in FIG. 1 also shows that replica bias circuit 120 is further coupled to receive a mode select signal 126, and bias signal 122 is further generated by replica bias circuit 120 in response to mode select signal 126. As will be discussed in further detail below, the open termination enable signal 128 is adapted to be disabled if an external load RLOAD 132 included in a receive circuit 130 is coupled to receive the output differential signal from the output driver 112 in accordance with the teachings of the present invention. In addition, as will be discussed in further detail below, mode select signal 126 may be utilized to adjust the voltage swing of the output differential signal generated by output driver 112 in accordance with the teachings of the present invention.

As shown in the depicted example, an internal regulator 118 is coupled to receive the first supply voltage VDD 110 to supply the second voltage VDDio 116 to the output driver 112. In one example, internal regulator 118 regulates the second supply voltage VDDio 116, and may therefore provide an improved power supply rejection ratio (PSRR) when generating second supply voltage VDDio 116. In one example, internal regulator 118 is coupled to generate the second supply voltage VDDio 116 in response to the bias signal 122, which is coupled to be received from replica bias circuit 120.

As shown it the example depicted in FIG. 1, an open termination circuit 124 is coupled to the differential pair of outputs DP 112 and DN 114 at the output of the output driver 112. The open termination circuit 124 is coupled to receive the open termination enable signal 128. As will be discussed in greater detail below, the open termination circuit 124 couples an internal load to the output of the output driver 124 in response to the open termination enable signal 128. In operation, the open termination enable signal 128 may be enabled if the external load RLOAD 132 of receive circuit 130 is not coupled to the output driver 112, which would consequently result in an impedance mismatch at the outputs of output driver 112. Accordingly, the open termination circuit 124 couples an internal load to the output of the output driver 124 if the open termination enable signal 128 is enabled to save power and improve efficiency. However, if the external load RLOAD 132 included in receive circuit 130 is coupled to the output of output driver 112, then the open termination circuit 124 is disabled and does not couple the internal load to the output of the output driver 124, since the impedances are matched between the output driver 112 and the receiver 130 across the differential pair of outputs DP 112 and DN 114. In one example, load RLOAD 132 provides a resistance of 100 ohms.

Figure 2:
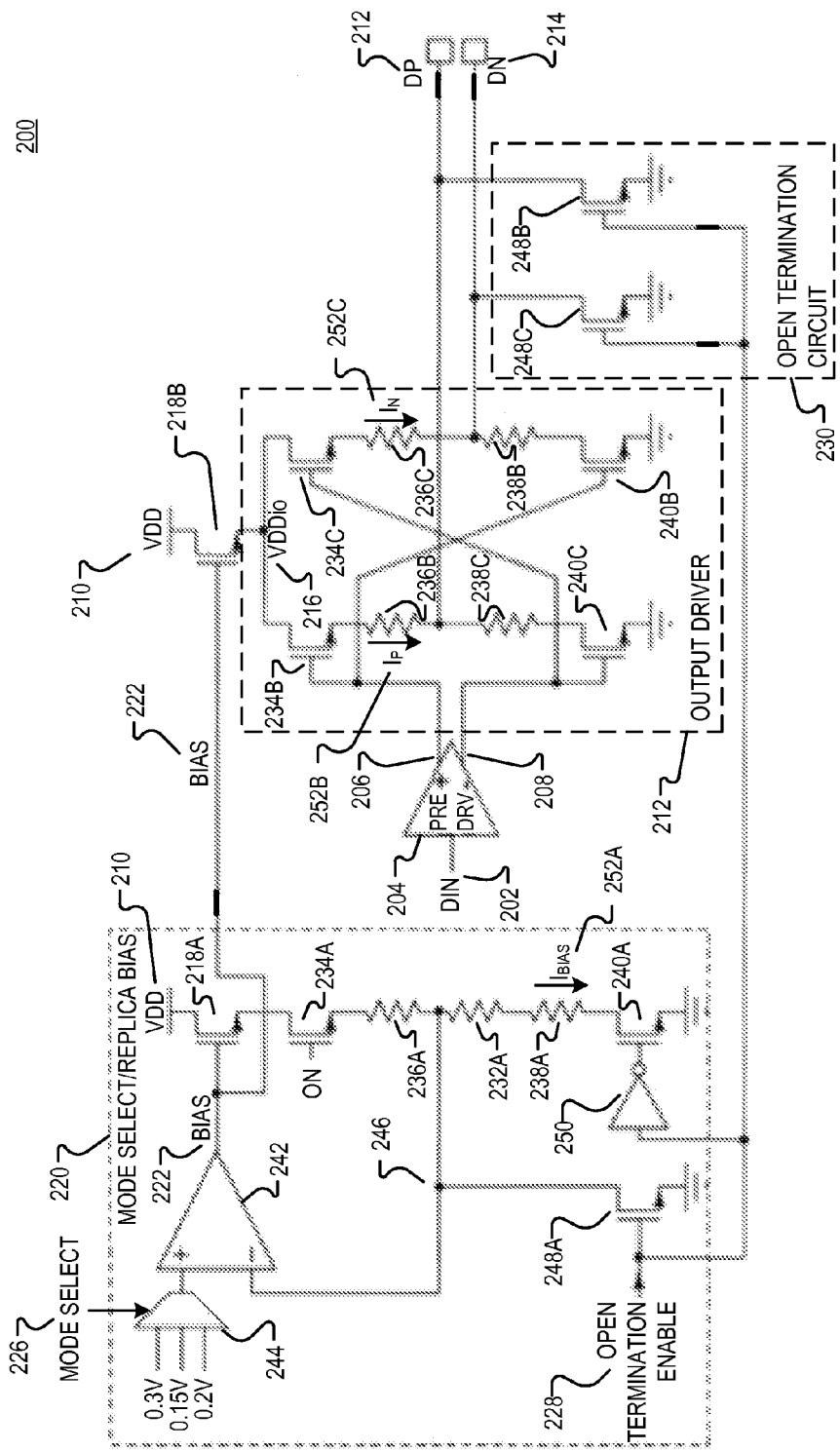
FIG. 2 is a schematic illustrating a detailed example of an interface circuit for transmitting a signal in accordance with the teachings of the present invention.

FIG. 2 is a schematic illustrating a detailed example of an interface circuit 200 for transmitting a signal in accordance with the teachings of the present invention. In the depicted example, it is appreciated that interface circuit 200 of FIG. 2 may be one of example of interface circuit 100 of FIG. 1, and that similarly named and numbered elements referenced below are coupled and function similar to as described above. Accordingly, elements in FIG. 1 may be also referred to below for explanation purposes.

As illustrated in the depicted example, interface circuit 200 of FIG. 2 includes a pre-driver 204 coupled to convert a single-ended signal data input signal DIN 202 to an intermediate differential signal at the differential pair of complementary outputs 206 and 208. An output driver 212 is coupled to receive the intermediate differential signal from the differential pair of outputs 206 and 208 to convert the intermediate differential signal to an output differential signal at the differential pair of outputs DP 212 and DN 214 of output driver 212. In one example, output driver 212 is coupled to be powered from a second supply voltage VDDio 216, to produce a second voltage swing across the complementary differential pair of outputs DP 212 and DN 214.

As shown in the depicted example, an internal regulator 218B coupled to receive supply voltage VDD 210 to supply the second voltage VDDio 216 to the output driver 212. In one example, internal regulator 218B regulates the second supply voltage VDDio 216, and may therefore provide an improved power supply rejection ratio (PSRR) when generating second supply voltage VDDio 216. In the example depicted in FIG. 2, internal regulator 218B is a source-follower coupled transistor, which includes a control terminal coupled receive bias signal 222 from replica bias circuit 220 to generate the second supply voltage VDDio 216 as shown.

In one example, the replica bias circuit 220 is also coupled to receive the supply voltage VDD 210 as shown to generate the bias signal 222. In the depicted example, replica bias circuit is also coupled to receive the open termination enable signal 228. As mentioned previously, the open termination enable signal 228 is adapted to be disabled if output driver 212 is terminated, such that an external load RLOAD 132 included in a receive circuit 130, as shown for example in FIG. 1, is coupled to receive the output differential signal from the output driver 212 through output terminals DP 212 and DN 214. Stated in another way, the open termination enable signal 228 is adapted to be enabled if it is to be assumed that there is no an external load coupled to output terminals DP 212 and DN 214 of output driver 212.

In operation, if the open termination enable signal 228 is enabled, then open termination transistor 248A is turned on, and transistor 240A is turned off through inverter 250. If on the other hand the open termination enable signal 228 is disabled, then open termination transistor 248A is turned off, and transistor 240A is turned on through inverter 250.

Replica bias circuit 220 includes a replica bias circuit path through which a bias current $I_{BIAS}$ 252A is conducted to generate the bias signal 222. In the example depicted in FIG. 2, the replica bias circuit path through which bias current $I_{BIAS}$ 252A is conducted includes transistor 234A and resistor 236A. If the open termination enable signal 228 is disabled, and open termination transistor 248A is turned off, and transistor 240A is turned on, then the replica bias circuit path continues from resistor 236A through resistor 232A, resistor 238A, and transistor 240A as shown. In the example, the control terminal of transistor 234A is coupled to receive an "ON" signal as shown such that the transistor 234A switch remain closed and conducts the bias current $I_{BIAS}$ 252A. If on the other hand the open termination enable signal 228 is enabled, and open termination transistor 248A is turned on, and transistor 240A is turned off, then the replica bias circuit path instead continues from resistor 236A through open termination transistor 248A.

As shown in the example depicted in FIG. 2, the replica bias circuit 220 also includes a comparator 242 having a first input (illustrated as non-inverting input of comparator 242 in FIG. 2) coupled to receive a reference voltage from a mode select circuit 244 responsive to a mode select signal 226. In the depicted example, mode select circuit 244 is illustrated as a multiplexor and is coupled to provide, for example, 0.3 volts, or 0.15 volts, or 0.2 volts as the reference voltage to comparator 242 in response to mode select signal 226. It is appreciated that the example voltages mentioned above are provided for explanation purposes, and that other voltage values may be utilized and enjoy the benefits of the present invention. As mentioned previously, the mode select signal 226 may be utilized to adjust the voltage swing of the output differential signal generated by output driver 212 by adjusting the reference voltage used to generate the bias signal 222, which is used to regulate the VDDio 216 voltage provided to output driver 212, which generates the voltage swing of the output differential signal generated by output driver 212 in accordance with the teachings of the present invention.

Continuing with the example depicted in FIG. 2, comparator 242 also includes a second input (illustrated as inverting input of comparator 242 in FIG. 2) coupled to receive a feedback signal 246 from the bias circuit path, to generate the bias signal 222 at the output of comparator 242. In the example, the feedback signal is generated at the terminal between resistor 236A and resistor 232A along the bias circuit path.

Replica bias circuit 220 also includes a transistor 218A coupled to the bias circuit path as shown. In the depicted example, it is appreciated that transistor 218A is source-follower coupled transistor and is a replica of transistor 218B. Like transistor 218B of the internal regulator, transistor 218A is also coupled to receive the supply voltage VDD 210 as shown to generate the bias signal 222. Transistor 218A also includes a control terminal coupled to receive the bias signal 222 from comparator 242. Thus, in the depicted example, the currents that are conducted through transistor 218A and transistor 218B in response to the bias signal 222 are proportional to one another.

For instance, as will be discussed in further detail below, in one example, the currents that are conducted through transistor 218A and transistor 218B are substantially equal to one another. In another example, the replica bias circuit 220 is a scaled down version of output driver 212, to save power and size. For instance, in one example, the current that is conducted through transistor 218A is scaled down to be for example 25% of the current that is conducted through transistor 218B. In such an example, transistor 218A can be 0.25 times the size of transistor 218B.

In an example in which the reference voltage selected from mode select circuit 244 is equal to 0.3 volts, the bias signal 222 used to control transistor 218B of the internal regulator provides the second supply voltage VDDio 216 equal to approximately 0.4 volts, which results in the second voltage swing of 0.1 volts to 0.3 volts in the output differential signal supplied to receiver 130 through output terminals DP 212 and DN 214 in accordance with the teachings of the present invention. In other examples, it is appreciated that the reference voltage selected from mode select circuit 244 have values other than 0.3 volts, and that different voltage swings may be provided to the output differential signal in accordance with the teachings of the present invention.

In the example depicted in FIG. 2, open termination circuit 230 is coupled to receive open termination enable signal 228, and is coupled to output terminals DP 212 and DN 214 of output driver 212. As shown in the illustrated example, open termination circuit 230 includes an open termination transistor 248B coupled to output terminal DP 212, and an open termination transistor 248C coupled to output terminal DN 214. As mentioned previously, the open termination enable signal 228 is adapted to be disabled if an external load RLOAD 132 included in a receive circuit 130 is coupled to output terminals DP 212 and DN 214. Stated in another way, the open termination enable signal 228 is adapted to be enabled if it is to be assumed that there is no an external load coupled to output terminals DP 212 and DN 214.

In operation, if the open termination enable signal 228 is enabled, it can be assumed that no external RLOAD 132 is coupled to output terminals DP 212 and DN 214, and open termination transistors 248B and 248C are therefore turned on. Therefore, with no external load coupled to output terminals DP 212 and DN 214, open termination transistors 248B and 248C provide internal loads to the output driver 212 when connected in accordance with the teachings of the present invention. As will be discussed in further detail below, it is appreciated that by providing internal loads with open termination transistors 248B and 248C, there is a load coupled to the source-follower coupled transistor 218B. Without a load coupled to source-follower coupled transistor 218B, the output "1" voltage levels at the output terminals DP 212 and DN 214 would increase to substantially higher levels compared to when there is a load coupled to the source-follower coupled transistor 218B. When the open termination enable signal 228 is disabled, it can be assumed that an external RLOAD 132 is coupled to output terminals DP 212 and DN 214 to provide a load to the source-follower coupled transistor 218B, and open termination transistors 248B and 248C can therefore be turned off.

As shown in the example depicted in FIG. 2, the output driver includes first and second circuit paths through which first and second internal currents $I_P$ 252B and $I_N$ 252C are conducted, respectively, to generate first and second output signals of the output differential signal at output DP 212 and output DN 214. In an example in which open termination enable signal 228 is disabled, and it is assumed that external RLOAD 132 is coupled to output terminals DP 212 and DN 214, and open termination transistors 248B and 248C are therefore turned off, the first circuit path through which first internal current $I_P$ 252B is conducted includes transistor 234B, resistor 236B, the external resistance of RLOAD 132 coupled to output terminals DP 212 and DN 214, resistor 238B, and transistor 240B. The second circuit path through which second internal current $I_N$ 252C is conducted includes transistor 234C, resistor 236C, the external resistance of RLOAD 132 coupled to output terminals DP 212 and DN 214, resistor 238C, and transistor 240C. In operation, the first and second complementary outputs 206 and 208 of the pre-driver 206 that generate the intermediate differential signal are utilized to control the transistors of the first and second circuit paths of output driver. For instance, in the depicted example, the first complementary output 206 of the pre-driver 204 is coupled to control transistor 234B and transistor 240B in the first circuit path. The second complementary output 208 of the pre-driver 204 is coupled to control transistor 234C and transistor 240C in the second circuit path. Since the outputs 206 and 208 of pre-driver 204 are complementary outputs, it is appreciated that only one of first internal current $I_P$ 252B and second internal current $I_N$ 252C conduct at a time.

In an example in which open termination enable signal 228 is enabled, and it is assumed that there is no external RLOAD 132 coupled to output terminals DP 212 and DN 214, and that there is an open circuit between output terminals DP 212 and DN 214. In this case, open termination transistors 248B and 248C are turned on in response to open termination enable signal 228 being enabled. As such, the first circuit path through which first internal current $I_P$ 252B is conducted includes transistor 234B, resistor 236B, and open termination transistor 248B. The second circuit path through which second internal current $I_N$ 252C is conducted includes transistor 234C, resistor 236C, and open termination transistor 248C.

As mentioned above, in one example, the first circuit path, and the second circuit path of output driver 212, and the bias circuit path of replica bias circuit 220 are all replicas of one another such that the bias current $I_{BIAS}$ 252A is proportional to the first internal current $I_P$ 252B when the first internal current $I_P$ 252B is conducted, and such that the bias current $I_{BIAS}$ 252A is proportional to the second internal current $I_N$ 252C when the second internal current $I_N$ 252C is conducted.

For instance, in one example, the bias current $I_{BIAS}$ 252A is substantially equal to the first internal current $I_P$ 252B when the first internal current $I_P$ 252B is conducted, and the bias current $I_{BIAS}$ 252A is substantially equal to the second internal current $I_N$ 252C when the second internal current $I_N$ 252C is conducted. As such, transistors 234A, 234B, and 234C are replicas of one another. In addition, transistors 240A, 240B, and 240C are also replicas of one another. Furthermore, open termination transistors 248A, 248B, and 248C are also replicas of each other. Similarly, resistors 236A, 236B, and 236C have substantially the same resistance, and resistors 238A, 238B, and 238C have substantially the same resistance. Moreover, the resistance of resistor 232A is substantially the same as the resistance RLOAD 132 of the receiver 130. In one example, RLOAD 132 is substantially equal to 100 ohms.

In another example, as mentioned above, replica bias circuit 220 is a scaled down version of output driver 212, to save power and size. For instance, in one example, bias current $I_{BIAS}$ 252A is scaled down to be for example 25% of the first internal current $I_P$ 252B or second internal current $I_N$ 252C, when conducted. In such an example, for the 0.25× scaled down version of replica bias circuit 220, transistors 234A and 240A can be 0.25 times the sizes of transistors 234B and 234C, and transistors 240B and 240C, respectively. In the example, resistors 236A and 238A can be 4 times the values of resistors 236B and 236C, and 238B and 236C, respectively, and resistor 232A can be 4 times the value of the resistance of RLOAD 132. Furthermore, in the example, open termination transistor 248A is 0.25 times the sizes of open termination transistors 248B and 248C. It is appreciated of course that these 25% scaling factor examples for replica bias circuit 220 are provided for explanation purposes, and that in other examples, replica bias circuit 220 may be scaled by other factors in accordance with the teachings of the present invention.

Figure 3:
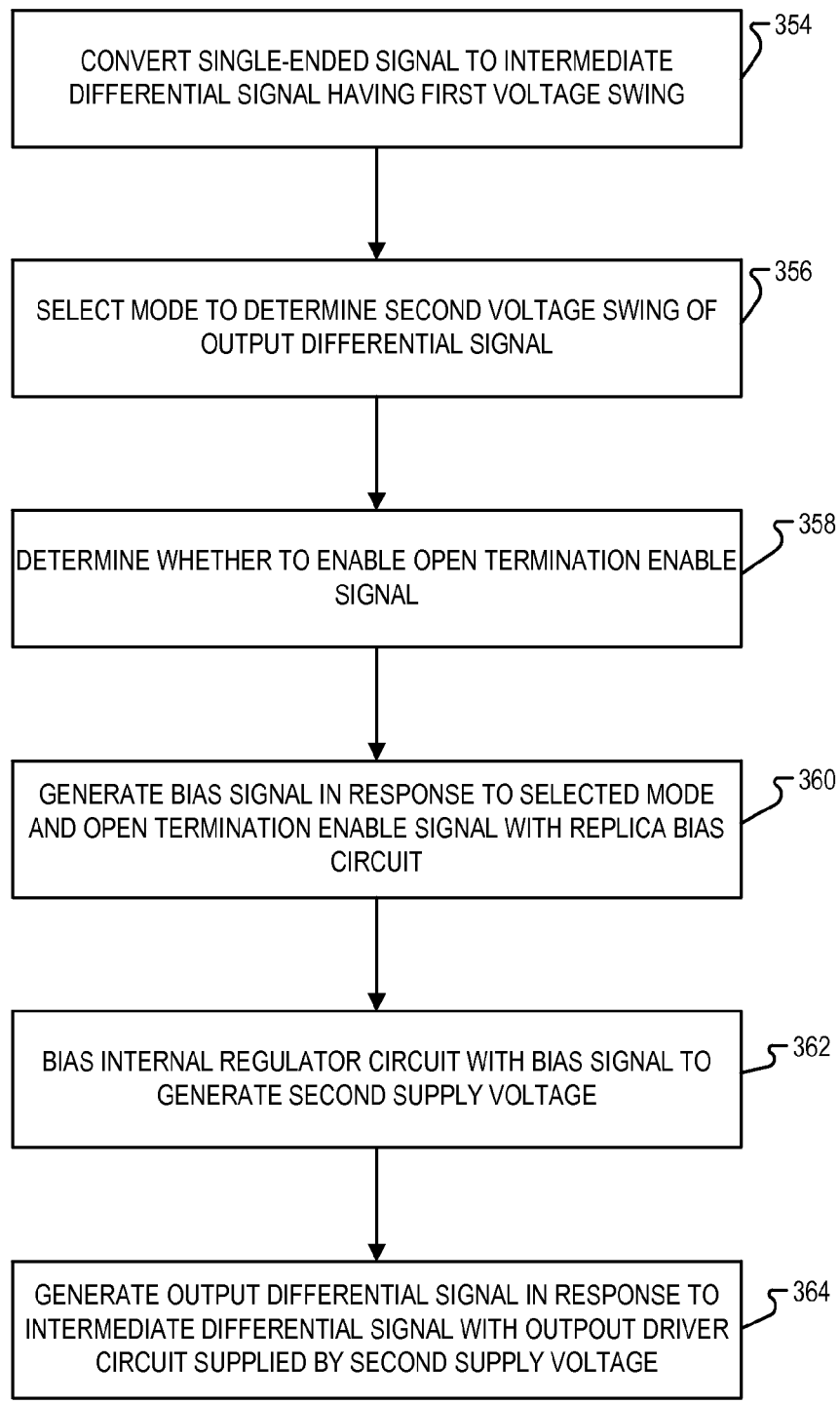
FIG. 3 is a flow chart illustrating one example of process for generating an output differential signal in accordance with the teachings of the present invention.

FIG. 3 is a flow chart illustrating one example of process 300 for generating an output differential signal in accordance with the teachings of the present invention. In the depicted example, it is appreciated that process 300 of FIG. 3 describes a process that may utilize an example interface circuit 200 of FIG. 2 or an example interface circuit 100 of FIG. 1, and that similarly named and numbered elements referenced below are coupled and function similar to as described above. Accordingly, elements in FIG. 1 and/or FIG. 2 may be also referred to below for explanation purposes. In addition, it is appreciated that the order in which some or all of the process occurs in FIG. 3 should not be deemed limiting. Rather, one of ordinary skill in the art having the benefit of the present disclosure will understand that some of the process may be executed in a variety of orders not illustrated, or even in parallel.

At process block 354, a single-ended signal is converted to an intermediate differential signal having a first voltage swing. For instance, as described in the examples above, a pre-driver 104 or 204 may be coupled to receive a single-ended data input signal 102 or 202 to be converted to an intermediate differential signal having a first voltage swing at outputs 106 and 108, or outputs 206 and 208. At process block 356, a mode is selected to determine a second voltage swing of the output differential signal. For instance, as described in the examples above, a mode select circuit 244 may receive a mode select signal 126 or 226 to select a reference voltage that can be used when generating a bias signal 122 or 222 to regulate a second supply voltage VDDio 116 or 216, which is used by the output driver 112 or 212 to generate the voltage swing of output differential signal.

At process block 358, it is determined whether to enable or disable the open termination enable signal. As discussed, the open termination enable signal may be enabled when it is to be assumed that there is no external load coupled to the output of the output driver 112 or 212, and the open termination enable signal may be disabled when there is an external load coupled to the output of the output driver 112 or 212. At process block 360, a bias signal is generated in response to the selected mode and the open termination enable signal with a replica bias circuit.

At process block 362, an internal regulator circuit coupled to receive the first supply voltage generates a second supply voltage in response to the bias signal. For instance, internal regulator 118 or 218B is coupled to receive VDD 110 or 210 to generate the second supply voltage VDDio 116 or 216 in response to bias signal 122 or 222. At process block 364, an output differential signal is generated in response to the intermediate differential signal with an output driver circuit coupled to be supplied power from the second supply voltage. For example, an output differential signal is generated at outputs DP 112 and DN 114, or outputs DP 212 and DN 214 in response to the intermediate differential signal from outputs 106 and 108, or outputs 206 and 208.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An interface circuit for transmitting a signal, comprising:
    a pre-driver coupled to receive a single-ended signal, wherein the pre-driver is coupled to convert the single-ended signal to an intermediate differential signal, wherein the intermediate differential signal has a first voltage swing responsive to a first supply voltage supplied to the pre-driver;
    an output driver coupled to receive the intermediate differential signal from the pre-driver, wherein the output driver is coupled to convert the intermediate differential signal to an output differential signal, wherein the output differential signal has a second voltage swing responsive to a second supply voltage supplied to the output driver;
    a replica bias circuit coupled to receive the first supply voltage to generate a bias signal, wherein the replica bias circuit is coupled to receive an open termination enable signal to adjust the bias signal in response to the open termination enable signal;
    an internal regulator coupled to receive the bias signal and the first supply voltage to supply the second voltage to the output driver in response to the bias signal; and
    an open termination circuit coupled to an output of the output driver, wherein the open termination circuit is coupled to receive the open termination enable signal to couple an internal load to the output of the output driver in response to the open termination enable signal.

2. The interface circuit of claim 1, wherein the output driver includes first and second circuit paths through which first and second internal currents are conducted, respectively, to generate first and second output signals of the output differential signal, wherein the replica bias circuit includes a bias circuit path through which a bias current is conducted to generate the bias signal, wherein the first circuit path, the second circuit path, and the bias circuit path are all replicas of one another such that the bias current is proportional to the first internal current when the first internal current is conducted, and such that the bias current is proportional to the second internal current when the second internal current is conducted.

3. The interface circuit of claim 2, wherein the bias current is substantially equal to the first internal current when the first internal current is conducted, and wherein the bias current is substantially equal to the second internal current when the second internal current is conducted.

4. The interface circuit of claim 2 wherein the replica bias circuit is further coupled to receive a mode select signal to adjust the bias signal to adjust the second supply voltage to adjust the second voltage swing in response to the mode select signal.

5. The interface circuit of claim 4, wherein the replica bias circuit comprises:
    a mode select circuit coupled to receive the mode select signal to output a reference voltage responsive to the mode select signal;
    a comparator coupled having a first input coupled to receive the reference voltage from the mode select circuit, and a second input coupled to receive a feedback signal from the bias circuit path, wherein the comparator has an output coupled to generate the bias signal; and
    a first transistor coupled to bias circuit path, wherein the first transistor includes a control terminal coupled to receive the bias signal, wherein the first transistor is coupled to receive the first supply voltage, wherein the bias current is conducted through the first transistor and the bias circuit path in response to the bias signal.

6. The interface circuit of claim 5, wherein the internal regulator comprises a second transistor coupled to the first and second circuit paths, wherein the second transistor is coupled to receive the first supply voltage, wherein the second transistor includes a control terminal coupled to receive the bias signal such that the second voltage supplied to the output driver is generated in response to the bias signal.

7. The interface circuit of claim 6, wherein the first transistor is a source-follower coupled transistor, and wherein the second transistor is a source-follower coupled transistor.

8. The interface circuit of claim 2 wherein each one of the first circuit path, the second circuit, and the bias circuit path includes:
    a third transistor; and
    a first resistor coupled to the third transistor.

9. The interface circuit of claim 8, wherein if the open termination enable signal is disabled, each one of the first circuit path, the second circuit, and the bias circuit path further includes:
    a second resistor coupled to the first resistor;
    a third resistor coupled to the second resistor; and
    a fourth transistor coupled to the third resistor.

10. The interface circuit of claim 8, wherein if the open termination enable signal is enabled, each one of the first circuit path, the second circuit, and the bias circuit path further includes an open termination enable transistor coupled to first resistor.

11. The interface circuit of claim 9, wherein the first and second circuit paths provide first and second complementary outputs of the output driver to generate the output differential signal coupled to be received by an external load coupled to the output driver, wherein the second resistor in the first and second circuit paths is a load resistance of the external load, and wherein the second resistor in the bias circuit path has a resistance proportional to the load resistance of the external load.

12. The interface circuit of claim 9, wherein the pre-driver has first and second complementary outputs coupled to generate the intermediate differential signal, wherein the first complementary output of the pre-driver is coupled to control the third and fourth transistors in the first circuit path, and wherein the second complementary output of the pre-driver is coupled to control the third and fourth transistors in the second circuit path.

13. The interface circuit of claim 1, wherein the second voltage swing of the output differential signal is less than the first voltage swing of the intermediate differential signal.

14. The interface circuit of claim 1, wherein the open termination enable signal is adapted to be disabled if an external load included in a receive circuit is coupled to receive the output differential signal from the output driver.

15. A method of generating an output differential signal, comprising:
   converting a single-ended signal to an intermediate differential signal having a first voltage swing with a pre-driver circuit coupled to be supplied power from a first supply voltage;
   selecting a mode to determine a second voltage swing of the output differential signal;
   determining whether to enable an open termination enable signal;
   generating a bias signal responsive to the selected mode and the open termination enable signal with a replica bias circuit coupled to be supplied power from the first supply voltage;
   biasing an internal regulator circuit coupled to be supplied power from the first supply voltage to generate a second supply voltage in response to the bias signal; and
   generating the output differential signal in response to the intermediate differential signal with an output driver circuit coupled to be supplied power from the second supply voltage.

16. The method of claim 15, further comprising:
   coupling a receiver circuit to the output driver; and
   receiving the output differential signal with receiver circuit.

17. The method of claim 15, wherein said determining if the open termination enable signal is enabled comprises determining if a receive circuit is coupled to the output driver, wherein the method further comprises:
   coupling an internal load to the output of the output driver if the open termination enable signal enabled; and
   coupling an open termination transistor to a bias circuit path included in the replica bias circuit if the open termination enable signal is enabled.

18. The method of claim 15, wherein generating the bias signal comprises:
   conducting a bias current through a bias circuit path included in the replica bias circuit;
   comparing the reference voltage to a feedback signal generated along the bias circuit path to generate the bias signal; and
   controlling a first transistor along the bias circuit path in response to the bias signal to control the bias current through the bias circuit path.

19. The method of claim 18, wherein controlling the first transistor along the bias circuit path in response to the bias signal comprises controlling a first source-follower coupled transistor along the bias circuit path in response to the bias signal, and
   wherein biasing the internal regulator circuit comprises controlling a second source-follower coupled transistor coupled to generate the second supply voltage in response to the bias signal.

20. The method of claim 18, wherein the pre-driver has first and second complementary outputs coupled to generate the intermediate differential signal, wherein generating the output differential signal comprises:
   controlling a first internal current through a first circuit path included in the output driver circuit in response to the first complementary output of the pre-driver circuit;
   controlling a second internal current through a second circuit path included in the output driver circuit in response to the second complementary output of the pre-driver circuit; and
   generating the output differential signal at first and second complementary outputs of the output driver circuit, wherein the first complementary output of the output driver is generated along the first circuit path, and wherein the second complementary output of the output driver is generated along the second circuit path.

21. The method of claim 20, wherein the first circuit path, the second circuit path, and the bias circuit path are all replicas of one another such that the bias current is proportional to the first internal current when the first internal current is conducted in response to the first complementary output of the pre-driver circuit, and such that the bias current is proportional to the second internal current when the second internal current is conducted in response to the second complementary output of the pre-driver circuit.

22. The method of claim 21, wherein the bias current is substantially equal to the first internal current when the first internal current is conducted, and wherein the bias current is substantially equal to the second internal current when the second internal current is conducted.

* * * * *